US005870627A

United States Patent [19]

O'Toole et al.

[11] Patent Number: 5,870,627

[45] Date of Patent: Feb. 9, 1999

[54] SYSTEM FOR MANAGING DIRECT MEMORY ACCESS TRANSFER IN A MULTI-CHANNEL SYSTEM USING CIRCULAR DESCRIPTOR QUEUE, DESCRIPTOR FIFO, AND RECEIVE STATUS QUEUE

[75] Inventors: Anthony J.P. O'Toole, San Jose; Sriraman Chari, Fremont, both of Calif.

[73] Assignee: Cirrus Logic, Inc., Fremont, Calif.

[21] Appl. No.: 576,868

[22] Filed: Dec. 20, 1995

[51] Int. Cl.[6] .......... G06F 13/28

[52] U.S. Cl. .......... 395/842; 395/872; 395/873

[58] Field of Search .......... 395/183.01, 200.07, 395/280, 825, 842, 886, 826, 873, 874, 250

[56] References Cited

U.S. PATENT DOCUMENTS

| | | | |
|---|---|---|---|
| 561,316 | 3/1896 | Kabenjian | 395/842 |
| 4,535,420 | 8/1985 | Fung | 364/900 |
| 4,792,892 | 12/1988 | Mary et al. | 394/200 |
| 4,901,232 | 2/1990 | Harrington et al. | 395/826 |
| 5,136,582 | 8/1992 | Firoozmand | 370/400 |
| 5,251,303 | 10/1993 | Fogg, Jr. et al. | 395/844 |
| 5,386,514 | 1/1995 | Lary et al. | 395/250 |
| 5,386,532 | 1/1995 | Sodos | 395/842 |
| 5,388,237 | 2/1995 | Sodos | 395/842 |
| 5,438,665 | 8/1995 | Taniai et al. | 395/845 |
| 5,448,702 | 9/1995 | Garcia, Jr. et al. | 395/280 |
| 5,513,368 | 4/1996 | Garcia, Jr. et al. | 395/842 |
| 5,561,820 | 10/1996 | Bland et al. | 395/847 |
| 5,574,944 | 11/1996 | Stager | 395/825 |
| 5,594,927 | 1/1997 | Lee et al. | 395/886 |
| 5,606,665 | 2/1997 | Yang et al. | 395/481 |
| 5,630,048 | 5/1997 | La Joie et al. | 395/183.01 |
| 5,634,099 | 5/1997 | Andrews et al. | 395/200.07 |
| 5,655,104 | 8/1997 | Petersen | 395/481 |
| 5,655,151 | 8/1997 | Bowes et al. | 395/842 |
| 5,664,116 | 9/1997 | Gaytan et al. | 395/601 |
| 5,751,951 | 5/1998 | Osborne et al. | 395/200.8 |

*Primary Examiner*—Thomas C. Lee
*Assistant Examiner*—Chien Yuan
*Attorney, Agent, or Firm*—Lowe, Price, LeBlanc & Becker; Frank D. Nguyen

[57] ABSTRACT

A method and apparatus of managing a multi-channel direct memory access (DMA) operation in which descriptors of data buffers are stored in a circular descriptor queue. The descriptors of those data buffers that are currently available for use in a DMA transfer are maintained in contiguous locations in the descriptor queue. The location of the first available descriptor and the number of currently available descriptors in the descriptor queue are provided to a network controller. Based on this information, the network controller then obtains a set of available descriptors and fills the corresponding buffers with data as it arrives on the different channels. When the use of a data buffer in a DMA transfer is complete, the descriptor for this buffer is made available again in the descriptor queue by re-filling this descriptor immediately following the available descriptors. No matter in which order the individual channels of the multi-channel system use and return the data buffers, the available descriptors are maintained in contiguous locations in the descriptor queue, increasing the efficiency of the system since searching through the descriptor queue for available descriptors is not required.

18 Claims, 11 Drawing Sheets

SYSTEM FOR MANAGING DIRECT MEMORY ACCESS TRANSFER IN A MULTI-CHANNEL SYSTEM USING CIRCULAR DESCRIPTOR QUEUE, DESCRIPTOR FIFO, AND RECEIVE STATUS QUEUE

FIELD OF THE INVENTION

The present invention relates to the field of data transfers in digital systems, and more particularly, to method and apparatus for managing direct memory access (DMA) transfers of data in a multi-channel system.

BACKGROUND OF THE INVENTION

In computer systems, electronic chips and other components are connected with one another by buses. A variety of components can be connected to the bus, providing intercommunication between all of the devices that are connected to the bus. One type of bus which has gained wide industry acceptance is the industry standard architecture (ISA) bus. The ISA bus has twenty-four (24) memory address lines which therefore provides support for up to sixteen (16) megabytes of memory. The wide acceptance of the ISA bus has resulted in a very large percentage of devices being designed for use on the ISA bus. However, high input devices commonly used in computer systems require faster buses. A solution to the general problem of sending and receiving data from the processor to any high input device is a local bus. Unlike the ISA bus, which operates relatively slowly with limited bandwidth, a local bus communicates at system speed and carries data in 32-bit blocks. Local bus machines remove from the main system bus those interfaces that need quick response, such as memory, display, and disk drives. One such local bus that has gained wide acceptance in the industry is the peripheral component interconnect (PCI) bus. The PCI bus can be a 32 or 64-bit pathway for high-speed data transfer. Essentially, the PCI bus is a parallel data path that replaces or is provided in addition to an ISA bus. The system processor and memory can be attached directly to the PCI bus, for example. Other devices such as graphic display adapters, disk controllers, sound cards, etc. can also attach directly or indirectly (e.g., through a host bridge) to the PCI bus.

In a digital computer, a microprocessor operates on data stored in a main memory. Since there are practical size limitations on the main memory, bulk memory storage devices are provided in addition to and separately from the main memory. When the microprocessor wants to make use of data stored in bulk storage, for example, a hard disk, the data is moved from the hard disk into the main memory. This movement of blocks of memory inside the computer is a very time consuming process and would severely hamper the performance of the computer system if the microprocessor were to control the memory transfers itself.

In order to relieve the microprocessor from the chore of controlling the movement of blocks of memory inside the computer, a direct memory access (DMA) controller is normally used. The DMA controller receives descriptor information from the microprocessor as to the base location from where bytes are to be moved, the address to where these bytes should go, and the number of bytes to move. Once it has been programmed by the microprocessor, the DMA controller oversees the transfer of the memory data within the computer system. Normally, DMA operations are used to move data between input/output (I/O) devices and memory.

Some of the efficiency of the PCI bus is due to the feature that the devices connected to the PCI bus can become DMA masters, and are not just slaves. Further, the PCI bus is a bursting bus, so that a single DMA transfer of data may be performed with one starting address followed by a large block of data. This bursting is more efficient than transferring data in individual small pieces, since the bus does not have to be constantly re-acquired for each piece of data.

Performing DMA transfers of data on a PCI bus in a multi-channel system, in which multiple sources transfer data to and from a host system over separate channels, is difficult to do efficiently. This is because it is hard to continue to do block transfers of data when multiple channels of data are attempting to use the bus. Obtaining and re-obtaining the bus for each of the separate channels as data comes in over the multiple channels reduces the efficiency of the bus, mitigating a significant advantage of the PCI bus.

Another complication created by a multi-channel system is that buffers may be returned in a different order than they were obtained. This is due to the fact that the channels will not typically complete their transfers at the same rate, so it is possible that a first data buffer obtained for a transfer on a first channel may not be returned for re-use before a second data buffer that was subsequently obtained for a transfer on a second channel that has a faster source of data. This presents a management problem in that the currently available data buffers (or descriptors for the buffers) need to be readily identifiable. Since the buffers are often returned out of order in a multi-channel system, the descriptors in a descriptor queue are normally marked to indicate whether the descriptors are available. The descriptor queue must then be searched whenever a transfer is to be performed to find currently available descriptors. This management overhead adds to the inefficiency of transfers.

SUMMARY OF THE INVENTION

There is a need for a method and apparatus that provides an efficient management of data transfers in a multi-channel DMA system.

This and other needs are met by the present invention which provides a method of managing a multi-channel direct memory access (DMA) operation, comprising the steps of providing each of a plurality of data buffers with a different index uniquely identifying the data buffer, and storing descriptors of the data buffers and the indexes of the data buffers in locations of a circular descriptor queue. An indication of the number of descriptors in the descriptor queue, corresponding to the data buffers, that are available for use in a DMA transfer, are provided to a network controller. The network controller obtains a set of available descriptors from the descriptor queue that are stored in a block of locations that are contiguous to one another in the descriptor queue. The set of descriptors becomes unavailable in the descriptor queue after they are obtained by the network controller. A DMA transfer with a host system is performed via the network controller using at least some of the available data buffers whose descriptors were obtained. An indication is provided to the host system as to which data buffers were used in the DMA transfer. The descriptor queue is then refilled with the descriptors and indices of the data buffers used in the DMA transfer, the descriptors being refilled in the locations in the descriptor queue that immediately follow the location of a last one of the available descriptors in the descriptor queue. The refilled descriptors constitute newly available descriptors in the descriptor queue, such that all of the available descriptors in the descriptor queue are always in contiguous locations in the descriptor queue.

An advantage made possible by certain embodiments of the present invention are that the management of multi-channels is simpler due to allowing the data buffers to be used by the channels and returned in any order. The network controller is aware of which descriptors (and therefore data buffers) are available in the descriptor queue for use in a DMA transfer, due to maintaining the available descriptors in contiguous locations. The re-filled descriptors, that are returned after the DMA transfer and become available for use again, simply follow the last one of the available descriptors. Hence, no matter in which order the individual channels use and return the data buffers, the available descriptors are maintained in contiguous locations in the descriptor queue. This provides an advantage over systems which need to mark descriptors as being available or not available, and which then require a search through the descriptor queue for available descriptors every time a channel is to perform a DMA transfer.

Another aspect of the present invention provides an arrangement for managing multi-channel direct memory access (DMA) transfers of data, comprising a bus, a host system having a central processing unit (CPU) and a memory coupled to the bus, the memory having a plurality of data buffers, and a multi-channel network controller coupled to the bus. The network controller transfers data received at the network controller to the host system via data buffers that are available for use. The memory includes a circular descriptor queue having a plurality of locations for storing descriptors of the data buffers. The descriptors of data buffers that are currently available for use in a DMA transfer are stored in locations contiguous to one another in the descriptor queue. A first register maintains the number of descriptors that are currently available in the descriptor queue, and a second register maintains the address of the location of the first descriptor of the contiguous currently available descriptors in the descriptor queue.

An advantage made possible by certain embodiments of the present invention is the elegant manner in which the currently available descriptors in the descriptor queue are identified to the network controller. Since the currently available descriptors are maintained in contiguous locations in the descriptor queue, knowledge of the address of the location of the first descriptor and how many descriptors are currently available provides all of the information that the network controller needs to retrieve available descriptors from the descriptor queue. This is much more efficient than the network controller obtaining the bus for each channel and examining the descriptors in the descriptor queue to locate available descriptors.

The earlier stated needs are also met by another aspect of the present invention which provides a multi-channel network controller for transferring data between a host system and external devices that are connected to the network controller by multiple channels, the host system having memory with data buffers, a descriptor queue and a receive status queue. The network controller comprises a first register that maintains a number of descriptors that are currently available in the descriptor queue for use in a DMA transfer, and a second register that maintains an address of the location of the first descriptor of the currently available descriptors in the descriptor queue. A descriptor FIFO is provided that temporarily stores currently available descriptors that are obtained from the descriptor queue. The network controller includes a descriptor processor that controls obtaining the currently available descriptors from the descriptor queue for temporary storage in the descriptor FIFO. The descriptor processor retrieves as many currently available descriptors as possible to fill the descriptor FIFO, based on the number in the first register and the address in the second register.

The foregoing and other features, aspects and advantages of the present invention will become more apparent from the following detailed description of the present invention when taken in conjunction with the accompanying drawings.

FIGS. *6a–6d* schematically depict portions of a central processing unit, a host memory, and a network controller in various stages of a receive operation in accordance with an exemplary embodiment of the present invention.

Figure 7:
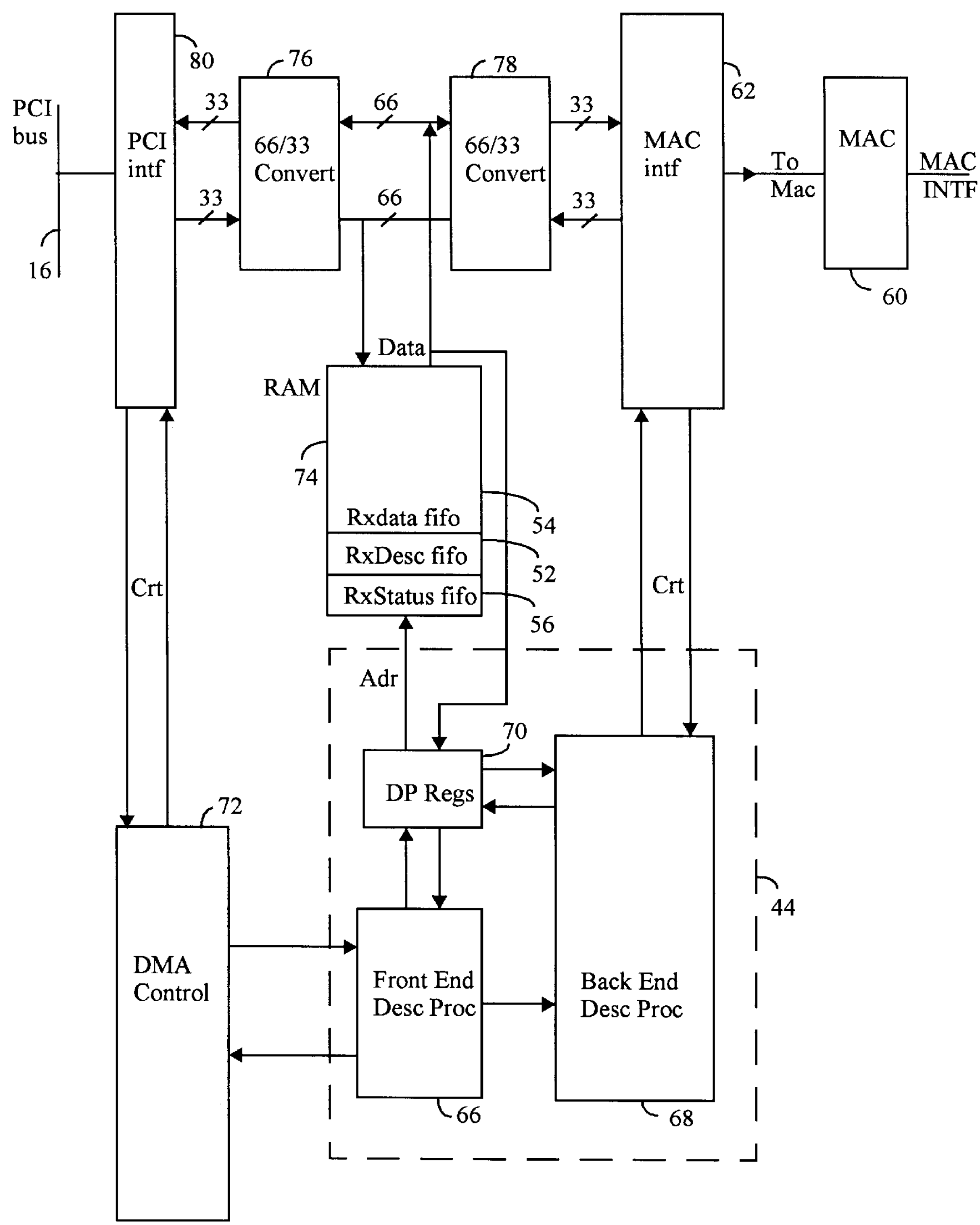

FIG. 7 is a block diagram of a network controller constructed in accordance with an embodiment of the present invention.

Figure 8:
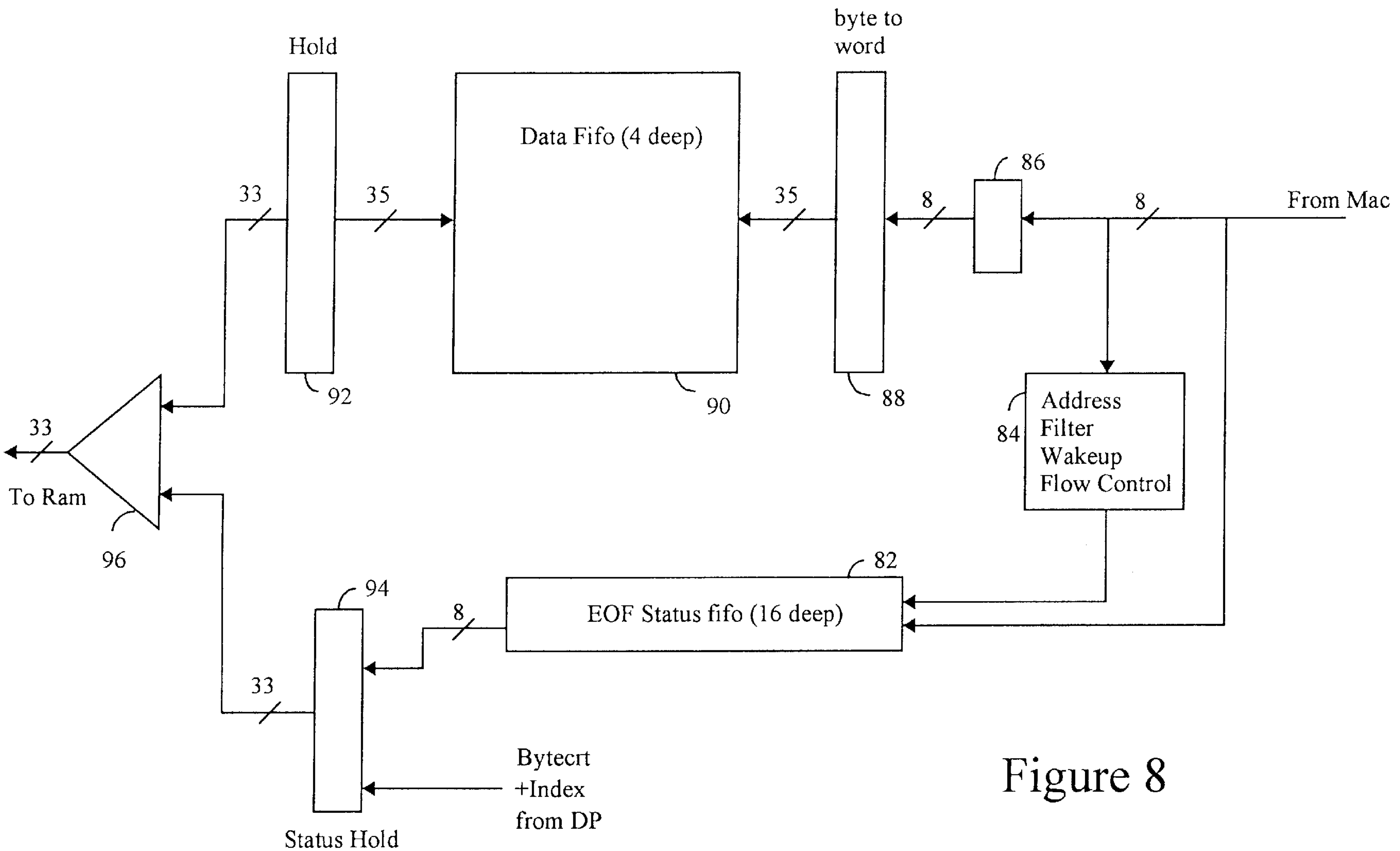

FIG. 8 is a block diagram of a media access controller interface constructed in accordance with an embodiment of the present invention.

DESCRIPTION OF THE PREFERRED EMBODIMENTS

Figure 1:
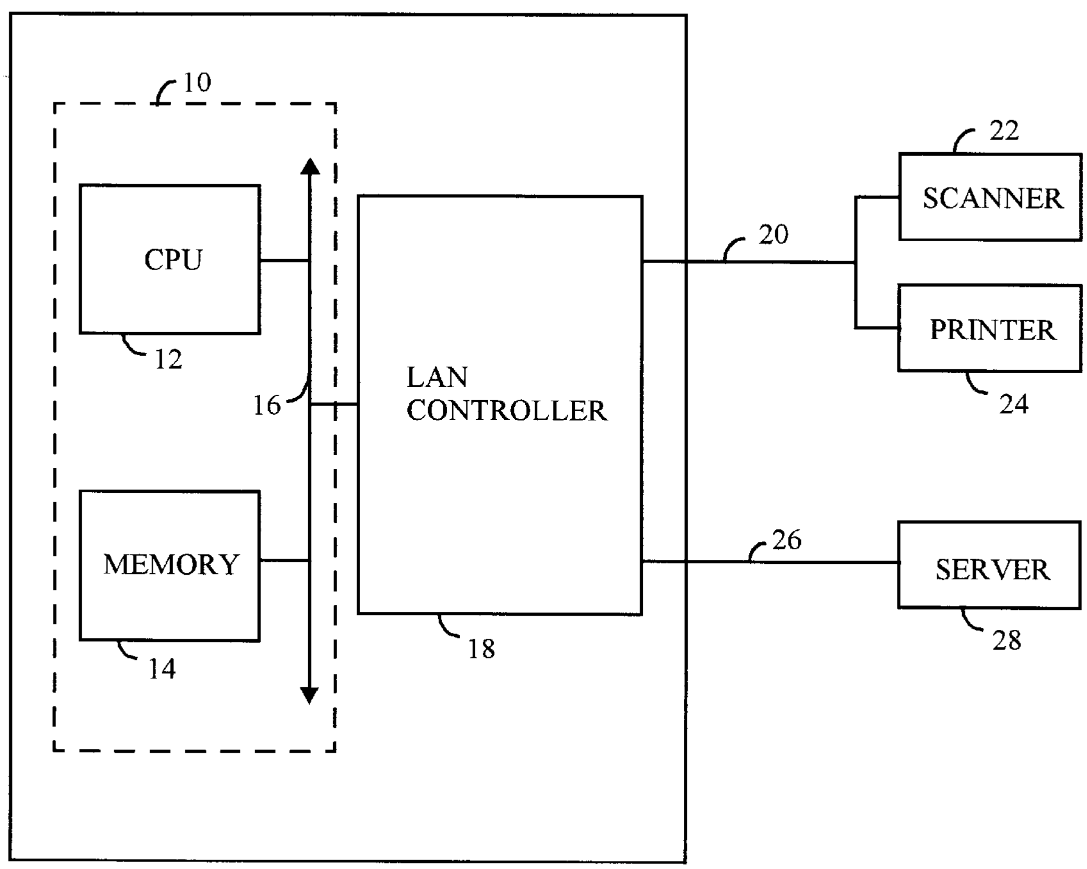
FIG. 1 is a block diagram of a multi-channel system constructed in accordance with an embodiment of the present invention.

FIG. 1 is a block diagram of an exemplary arrangement in which the present invention can be used. This arrangement includes a host system 10 that includes a central processing unit (CPU) 12 and a host (or main) memory 14. The CPU 12 and the host memory 14 are both coupled to a bus 16, for example, a peripheral component interconnect (PCI) bus.

The host system 10 has a multi-channel network controller 18 that provides DMA control and an interface between the host system 10 and peripheral devices and external networks. For example, the multi-channel network controller 18 in FIG. 1 is depicted having an interface to a SCSI line 20, to which a scanner 22 and a printer 24 are connected. On a different channel, the network controller 18 provides an Ethernet interface (10Base-T or 100Base-T, for instance) for an Ethernet line 26 to which a server 28 is connected.

The network controller 18 operates as a bus master to transfer all receive and transmit, data and status, across the PCI bus 16. The transfers are managed by two sets of queues for each direction, a descriptor queue and a status queue. These queues are located in host memory 14. The network controller 18, which will be described in FIG. 7, contains a receive descriptor processor that uses the two circular queues in host memory 14 to manage the transfer of receive data frames.

Figure 2:
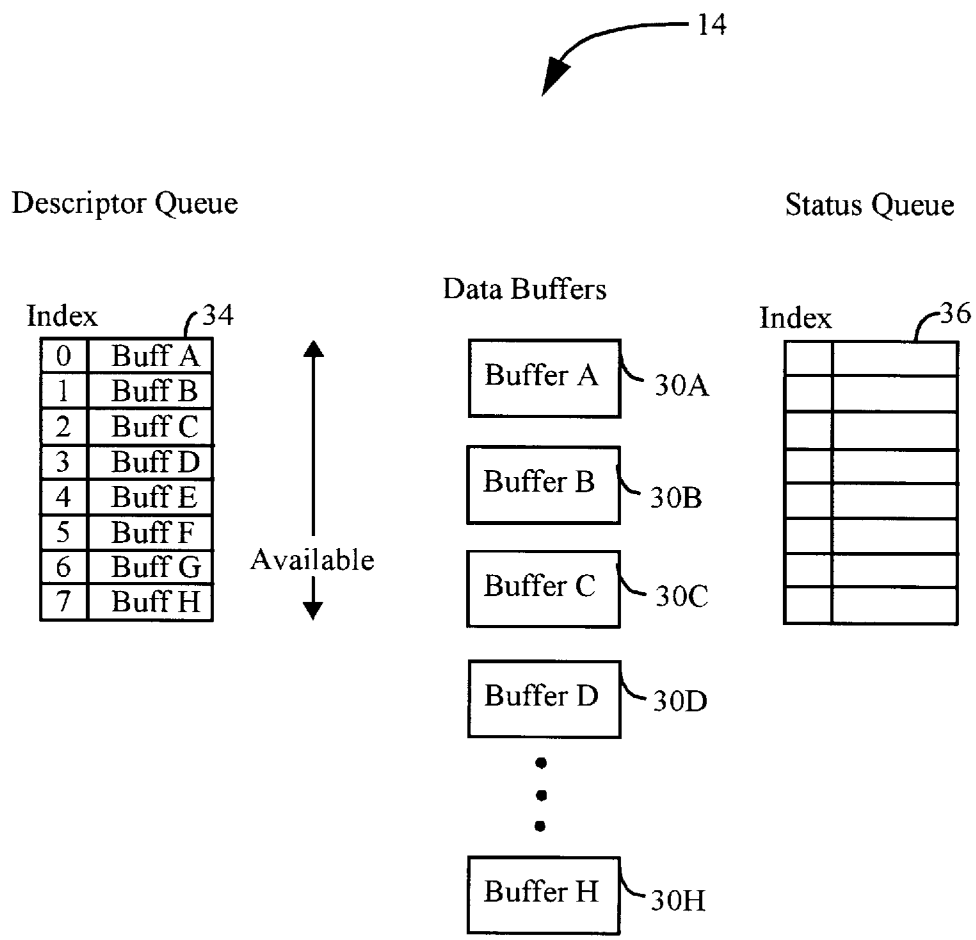
FIG. 2 is a block diagram of a system view of a portion of host memory.

FIG. 2 is a logical view of a portion of the host memory 14. The host memory 14 is configured to have a number of data buffers 30 that buffer the data received from the network controller 18 and which will be used by the host CPU 12 and/or stored in memory locations, such as on a hard-disk drive. Referring now to FIGS. *6a–6d,* which show the CPU 12 that includes a reference table 32 containing information, such as the size of a buffer 30, for each of the specific data buffers 30, and is accessed through an index given for each data buffer 30. The reference table 32 provides a stable source of information for the CPU 12 regarding the different data buffers 30, since it remains unchanged through data transfer operations, unless it is modified by the CPU 12.

The two circular queues in the memory 14 manage the transfer of receive data frames. A receive descriptor queue 34 informs the network controller 18 of which data buffers are available for use, by passing descriptors of data buffers that are currently "free" (available to receive data) from the memory 14 to the network controller 18. A receive status queue 36 receives status entries from the network controller 18 that indicate when a data buffer has been used to store a frame of data. The separation of the receive descriptor queue 34 and the receive status queue 36 enables the use of burst transfers of descriptors and of status entries to and from the queues 34, 36. This reduces the overall amount of bus usage, since the bus does not have to be accessed for each descriptor and for each status entry individually, but rather is accessed for bursts of descriptors and bursts of status entries.

Receive descriptors are passed from the CPU 12 and the host memory 14 to the network controller 18 via the receive descriptor queue 34. The receive descriptor queue 34 is a circular queue occupying a contiguous area of memory. The location and size of the queue are set at initialization by the CPU 12 writing to a receive descriptor queue base address register, a receive descriptor current address register, and a receive descriptor queue base length register, these registers not being illustrated. In certain embodiments of the invention, the descriptor queue base address points to a double word aligned, memory location. The current address is set to point to the next descriptor to be used, this normally being the first entry (same value as the base address). The receive descriptor queue base length is set to the length in bytes of the receive descriptor queue 34, the length being an integral number of descriptors.

Figure 6A:
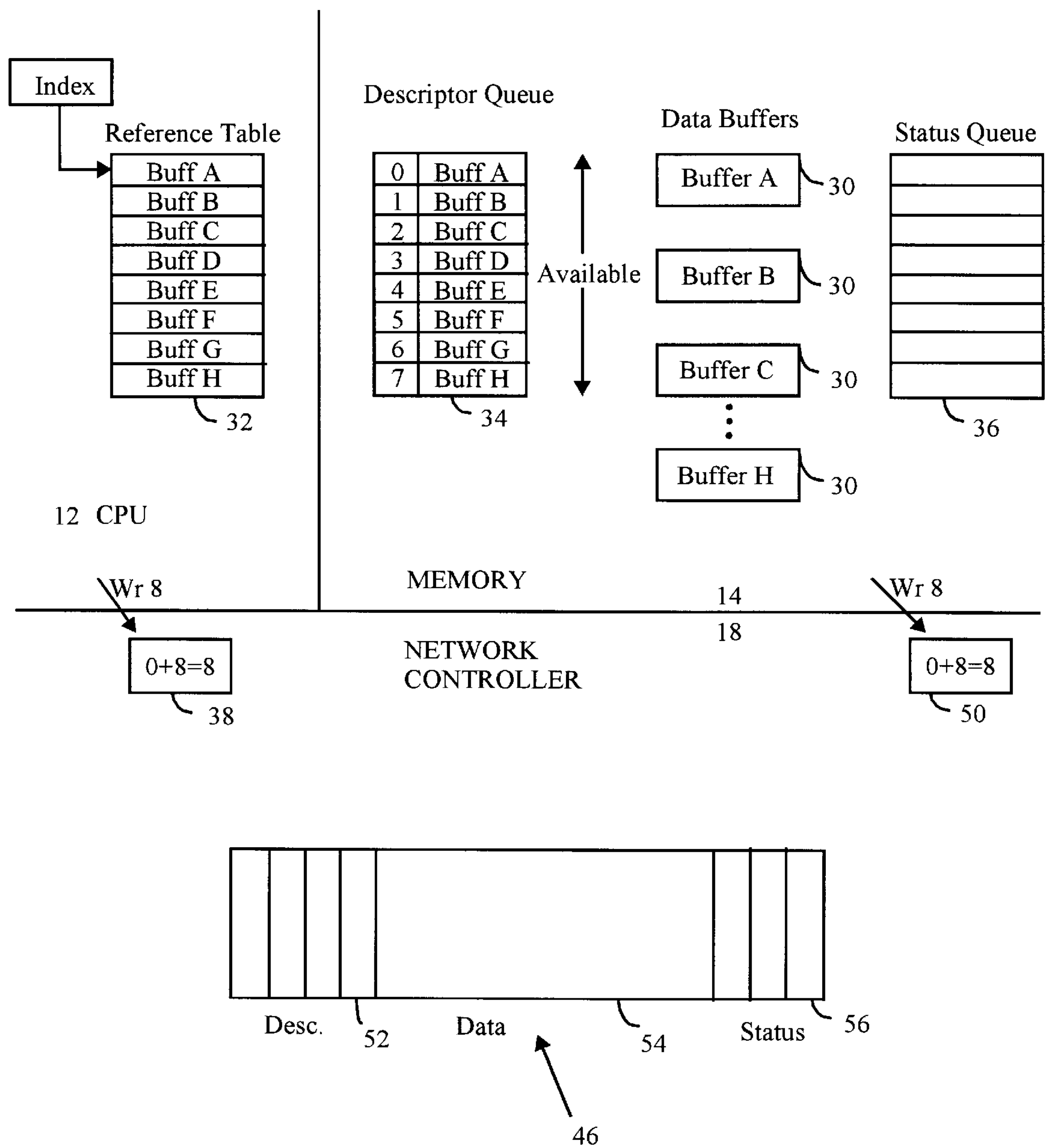

In normal operation, following initialization, the CPU 12 does not need to access the receive descriptor base starting address register, the receive descriptor base length register, or the receive descriptor current address register. Control of the use of the descriptors is handled using a receive descriptor enqueue register 38 (FIG. 6*a*). The term "enqueue" refers to the action of adding descriptors to the end of an existing receive descriptor queue 34. To enqueue receive descriptors, the CPU 12 writes the number of descriptors to the receive descriptor enqueue register 38, and the number is automatically added to the existing value. When the network controller 18 consumes descriptors by reading them into its on-chip storage, the number read is subtracted from the total. The CPU 12 can read the total number of unread valid descriptors left in the receive descriptor queue 34 from the receive descriptor enqueue register 38.

Figure 3:
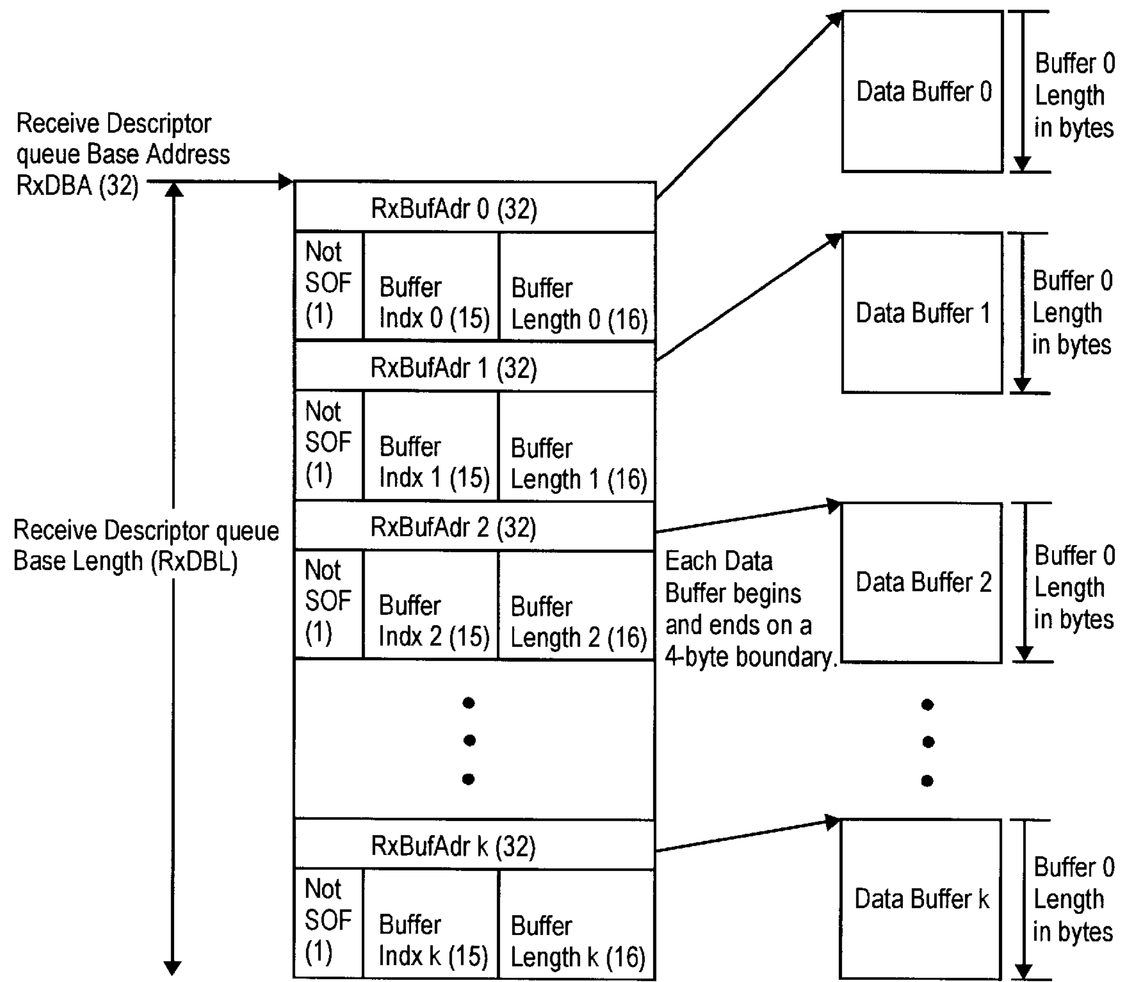
FIG. 3 depicts an exemplary format of receive descriptors.
Figure 4:
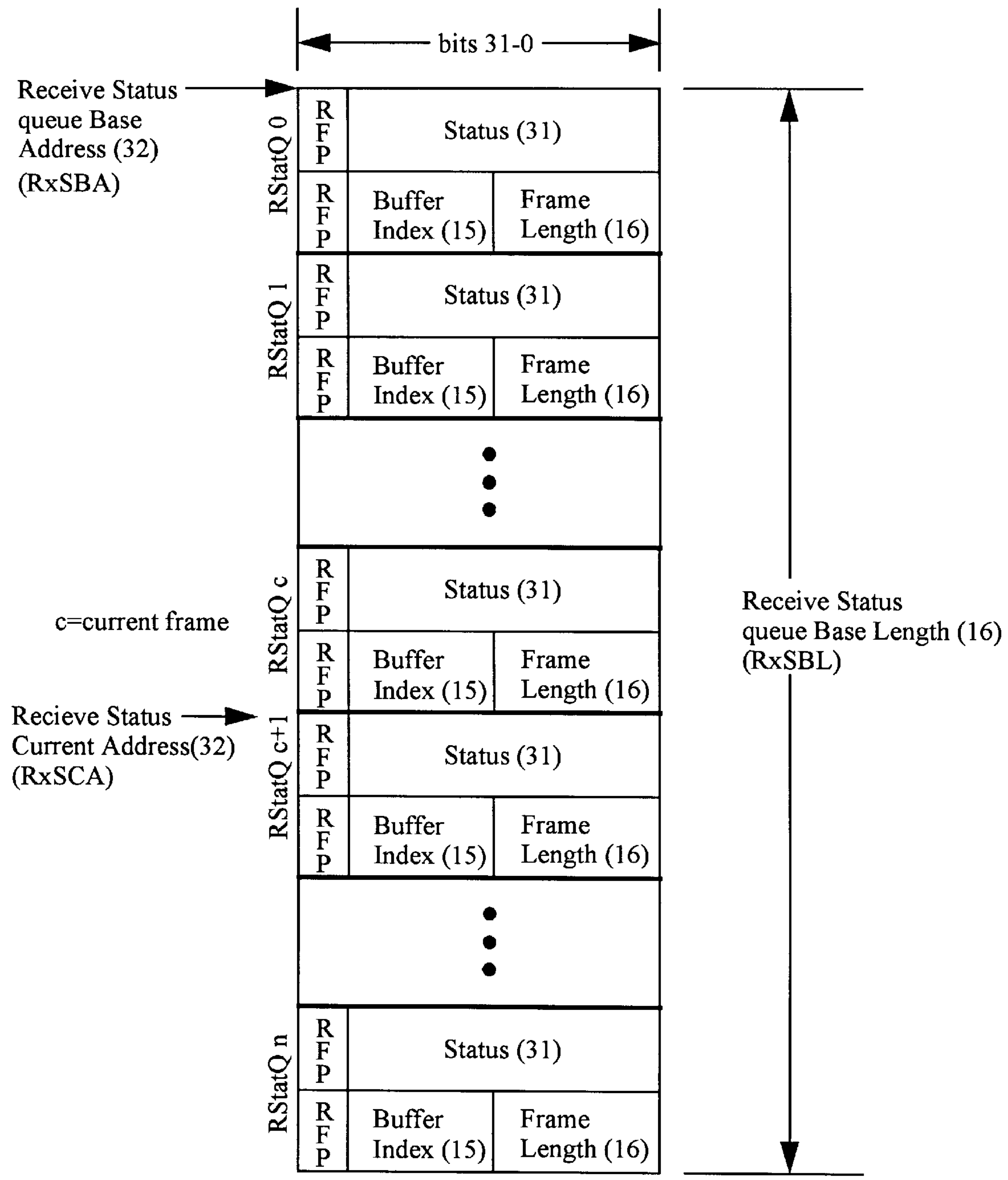
FIG. 4 depicts an exemplary embodiment of a receive status queue.

An exemplary embodiment of a format for the receive descriptors in the receive descriptor queue 34 is depicted in FIG. 3. Each descriptor entry defines one receive data buffer, and consists of two double words (32 bits each). The first double word contains the address (RxBufAdr k) of the data buffer 30*k*, which is double word aligned in the exemplary embodiment. The second word contains three fields: a Not Start of Frame bit, a buffer index, and a buffer length. The buffer length field is a 16-bit value that specifies the maximum number of bytes to be used in the corresponding data buffer 30 and is an integral number of double words in certain embodiments. The buffer index is a fifteen bit value that can be used by the host CPU 12 to keep track of buffers 30 as they are exchanged with the network controller 18. When the network controller 18 reads a descriptor it keeps a copy of the index, which it includes in any receive status entry associated with that buffer 30. The Not Start of Frame bit may be set by the host CPU 18 on any buffer 30 in which it does not want a new frame to be started. Such a buffer 30 would then only be used for chaining of frame fragments. In certain embodiments of the invention, this mode is used to align frames on boundaries coarser than descriptors, such as when multiple physical address descriptors are used to describe one virtual address buffer.

An exemplary embodiment of the receive status queue 36 and the format of status entries is depicted in FIG. 6. The receive status queue 36 is used when passing receive status from the network controller 18 to the CPU 12. In operation, the receive status queue 36 is similar to the receive descriptor queue 34, and it is also a circular queue in contiguous memory space in certain embodiments of the invention. The location and size of the receive status queue 36 are set at initialization by the CPU 12 writing to a receive status queue base address register and a receive status queue base length register (these registers not being illustrated). The receive status queue base address points to a double word aligned, memory location. The receive status queue length is set to the actual status queue length in bytes, this being an integral number of status entries and not exceeding 64 KBytes total in exemplary embodiments. A receive status current address is set to point to the first status entry to be used, this normally being the first entry (same value as the base address).

Once the receive status queue initialization is complete, the receive status enqueue register 50 (FIG. 6*a*) is used by the CPU 12 to pass free status locations (corresponding to the free buffers) to the network controller 18. The receive status enqueue register 50 may be located in either the host memory 14 or on the network controller 18. The CPU 12 writes the number of additional free status locations available to the receive status enqueue register 50. The network controller 18 adds the additional count to the previously available to determine the total number of available receive status entries. When the network controller 18 writes status to the receive status queue 36, it subtracts the number written from this total. The current value of the total receive status entries is available by reading the receive status enqueue register 50.

In certain embodiments of the invention, there is a restriction on writing too high a value to the receive status enqueue register 50, so that no more than 255 status entries may be added in one write. If a number greater than this needs to be written the write is broken up into more than one operation (i.e., to add 520 status entries-write 255, write 255, write 10).

Receive status entries are written to the receive status queue 36 by the network controller 18 following one of three possible events: end of header, end of buffer, or end of frame. The status entry is always written after the appropriate data transfer has been made. For example, the end of frame status is written after the last byte of data has been written to the data buffer 30, not before. The end of frame (EOF) and end of buffer (EOB) bits in the status entry can be used to determine the cause of a status entry.

The values of the EOF and EOB bits provide indications to the CPU 12 of certain conditions. For example, if the EOF bit is zero and the EOB bit is set, the status entry indicates that the end of a receive buffer has been reached before the end of the receive frame. If the receive buffers are much smaller than the frame size there may be many such statuses per frame. As another example, when the EOF and EOB bits are both set the status entry indicates the end of frame has been transferred. The EOB is always set at this time to indicate that the network controller has finished transferring to the buffer 30, but the buffer 30 is not necessarily full.

When a status event causes an interrupt, an interrupt pin (asserting an interrupt signal) will be activated after the status entry has been transferred to the receive status queue 36.

Figure 5:
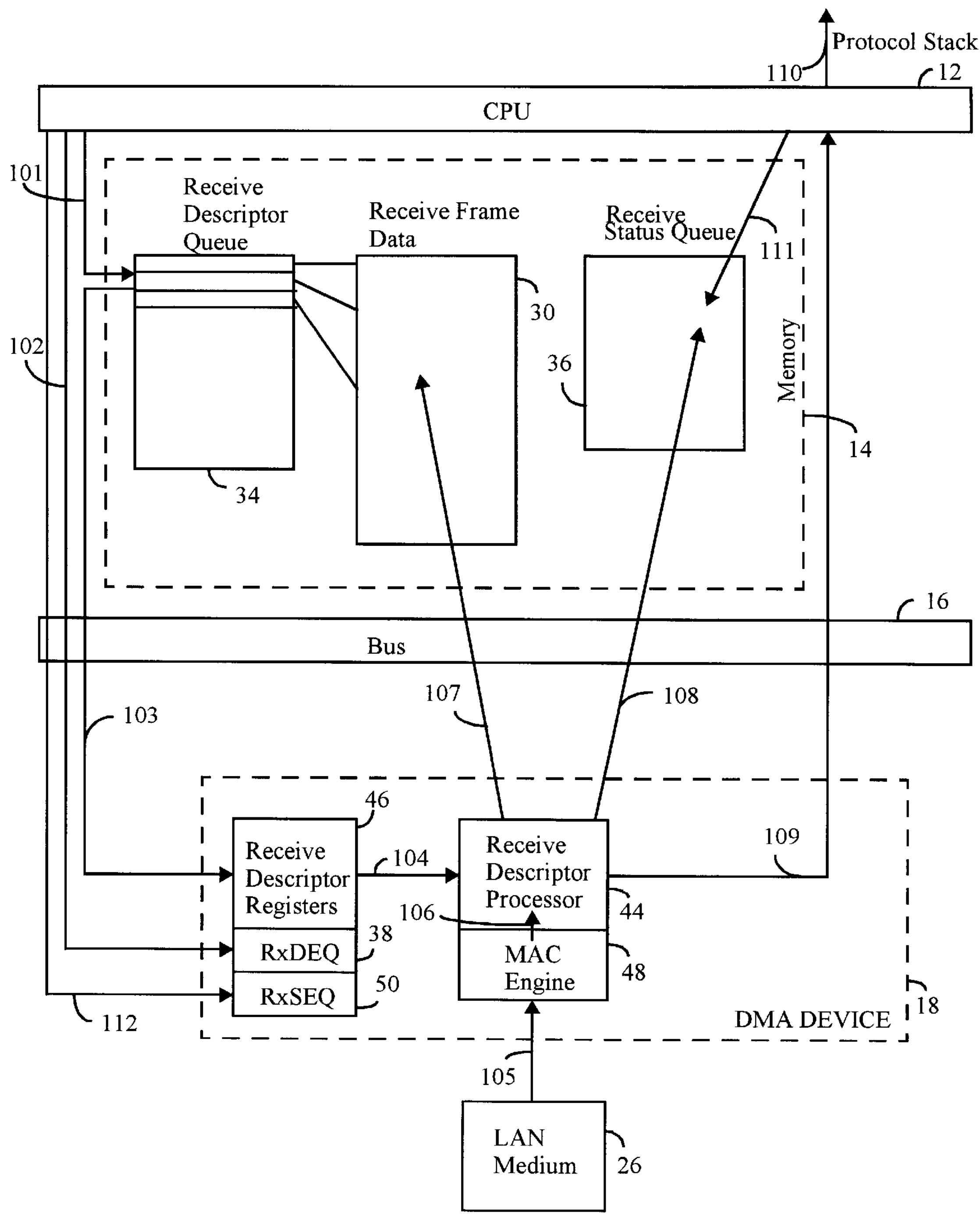
FIG. 5 is a block and flow diagram of an exemplary embodiment of a receive flow in accordance with the present invention.

An example of a receive flow in accordance with embodiments of the present invention is depicted in a block and flow diagram of FIG. 5. In this diagram, the components of the arrangement are depicted very schematically, for purposes of explaining the flow of receiving data.

In step 101, the CPU 12 initializes some number of receive descriptors in the receive descriptor queue 34. The CPU 12 writes the receive descriptor enqueue register 38 (shown in this embodiment as located on the network controller 18) with the additional number of receive descriptors, in step 102. An on-chip receive descriptor processor 44 of the network controller 18 fetches the receive descriptors from the receive descriptor queue 34 into an internal FIFO (receive descriptor registers) 46 in step 103. The receive descriptor processor 44 will at the same time decrement the receive descriptor enqueue register 38 for each receive descriptor fetched. The address of the next receive data buffer 30, obtained from one of the fetched receive descriptors, is then loaded into the receive buffer current address register of the receive descriptor processor 44, in step 104.

A frame of data is received by the network controller 18 over one of the channels, e.g. a local area network (LAN) medium 26, in step 105. A media access controller (MAC) engine 48 passes the frame of data to the receive data FIFO of the receive descriptor processor 44 in step 106. The receive descriptor processor 44 stores the frame of data into one or more buffers 30 in host memory 14, in step 107. The above three steps can overlap one another.

In step 108, the end of frame (EOF) status is written to the receive status queue 36, and the receive status enqueue register 50 is decremented by one. If specified interrupt conditions are met, the CPU 12 is interrupted. The received frame is passed on for processing (to a protocol stack, for example) in step 110. The CPU 12 clears a receive frame processed bit in the status entry in the receive status queue 36 which corresponds to the data buffer(s) 30 in which the frame of data was stored, in step 111. The CPU 12 writes the number of entries processed in the receive status queue 36 in step 112, thereby freeing them for future use by the network controller 18.

FIGS. 6*a*–6*d* schematically depict the CPU 12, the host memory 14 and portions of the network controller 18, to illustrate in more detail an example of queue management according to the present invention. In FIG. 8*a,* queue initialization is performed, such as setting the descriptor queue length, etc. This initialization process includes loading the reference table 32 of the CPU 12 with the specific information regarding each of the individual data buffers 30A–30H. Each one of the data buffers 30A–30H has an individual index that is copied from queue to FIFO to queue, as will become apparent. This avoids the need to copy all of the information in the reference table 32 for each buffer 30A–30H as the queues and FIFOs are updated to add or remove a buffer 30. Instead, this information is preserved in the reference table 32 for use by the CPU 12 at the time it processes the status entry in the receive status queue 36.

In FIG. 6*a,* the receive descriptor registers 46 are shown as including a descriptor FIFO 52, a data FIFO 54, and a status FIFO 56. The CPU 12 writes the number of available descriptors in the receive descriptor queue 34 into the receive descriptor enqueue 38. At initialization, in this example, there are eight available descriptors. The same value of eight is also written into the receive status enqueue register 50.

Figure 6B:
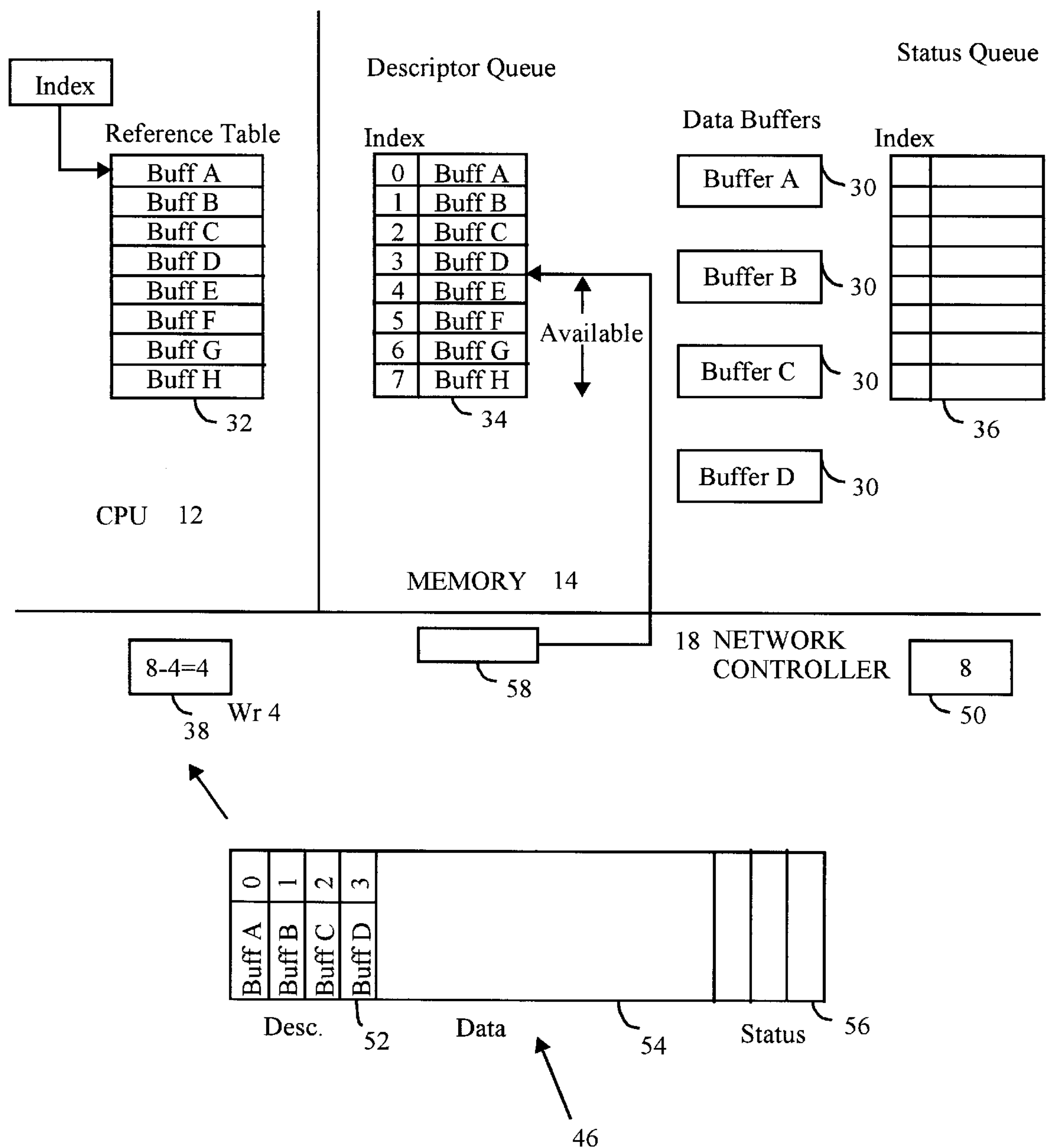

In FIG. 6*b,* the network controller 18 reads as many descriptors as it can fill into its descriptor FIFO 52. The network controller 18 will also write the number of descriptors that have been written into its FIFO 52 into the receive data enqueue register 38. This number is subtracted from the previously written value. In this example, the descriptor FIFO is 4 deep, so that the descriptors for four data buffers 30A–30D are written into the descriptor FIFO 52. The value 4 is written back into the receive descriptor enqueue register 38, leaving a value of 4 (8–4=4) in the receive descriptor enqueue register 38. The contents of the receive descriptor enqueue register 38 represents the number of currently available descriptors (corresponding to buffers 30) in the receive descriptor queue 34.

When the network controller 18 reads the descriptors into the descriptor FIFO 52, it also copies the accompanying index for the buffers 30A–30H. A receive descriptor queue current address register 58 in the network controller 18 is updated to point to the next available buffer (buffer 30E in FIG. 6B) in the receive descriptor queue 34. The receive descriptor queue current address register 58 provides the address necessary for the network controller 18 to retrieve the next available register(s) when made available by the CPU 12, as indicated by writing to the receive descriptor enqueue register 38.

Figure 6C:
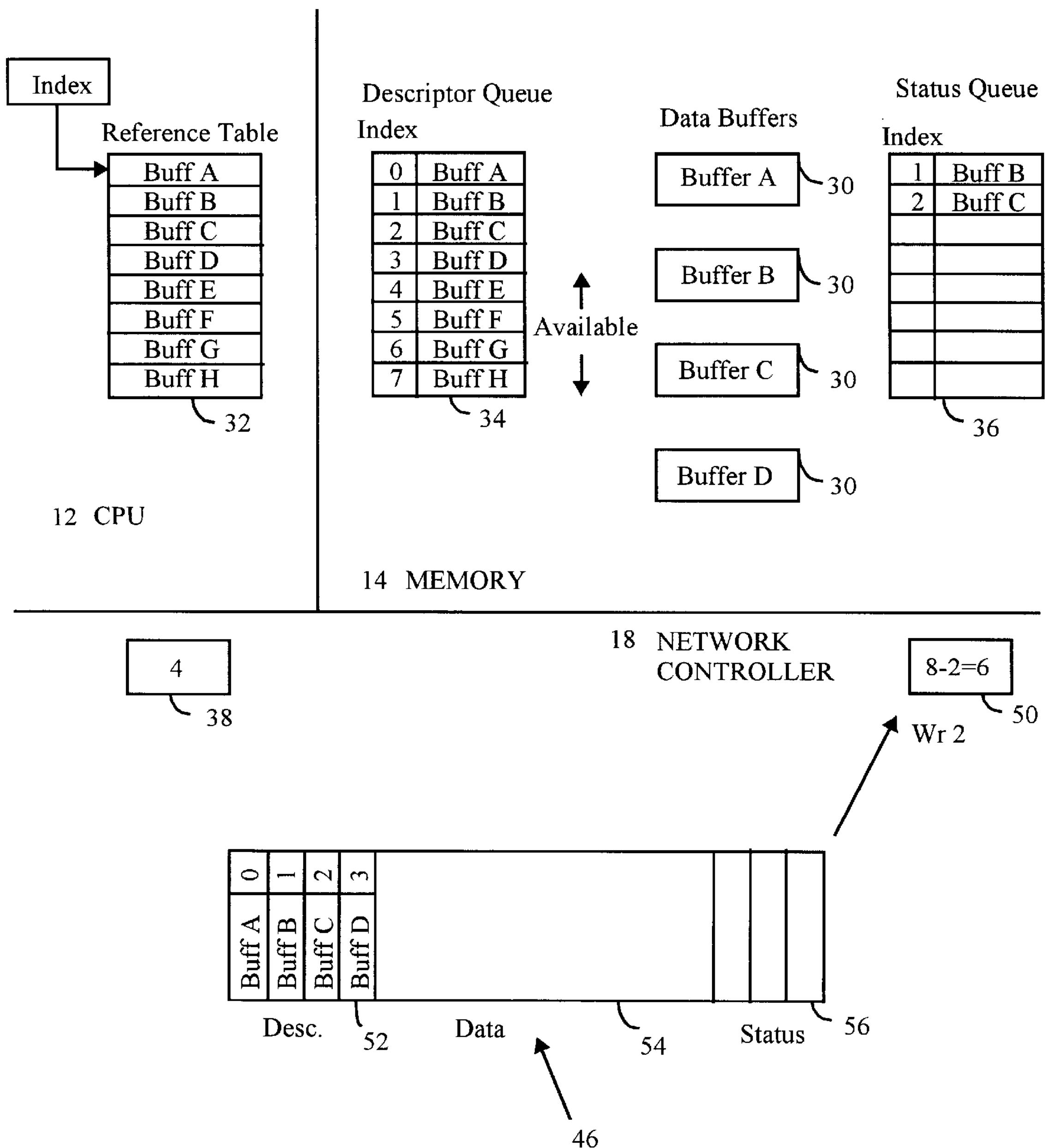

Assume for this operational example that data frames are being received on two different channels of the network controller, channels 3 and 4, for example. Assume also that the source connected on channel 4 is sending data frames faster than the source connected on channel 3. Referring to FIG. 6C, the data frames that are being received are temporarily stored in the data FIFO 54. The data frames are then stored in one or more of the buffers 30A–30D that are in the descriptor FIFO 52. The first source of data frames to finish transmission of a data frame or frames, the source on channel 4, will fill one or more buffers 30 before the source on channel 3. In this example, data buffers 30B and 30C (having indices 2 and 3 respectively) are filled with data from the source on channel 4, while data buffers 30A and 30D (with indices 1 and 4 respectively) are filled with data from the source on channel 3.

The data buffers 30B, 30C fill with data first in this example, and status entries for these buffers are written to the receive status queue 36 from the status FIFO 56. The indices (1 and 2) for the data buffers 30B, 30C are copied into the status FIFO 56 from the descriptor FIFO 52. The indices are also copied into the receive status queue 36. This makes the indices available for use by the CPU 12 with the reference table index 32 to obtain any information necessary on buffers 30B, 30C. The information itself, such as buffer length, was not copied from descriptor queue 34 to descriptor FIFO 52 to status FIFO 56 to receive status queue 36. Instead, only the index for each buffer is copied.

The receive status enqueue register 50 is decremented by 2, representing the number of available status entries in the receive status queue 36. After the two status entries are written into the receive status queue 36, there remain six available (free) status entries in the receive status queue 36.

The receive status enqueue register 50 therefore holds the value of 6 (8−2=6) after it is decremented.

The writing of the status entries into the receive status queue 36 causes an interrupt. The CPU 12 will read the status entries, as well as their indices. In the illustrated example, the CPU 12 will read index 1 and determine that buffer 30B was the buffer actually used. The CPU 12 may then decide to pass on the information in the buffer 30B elsewhere, discard the data, or otherwise process the status entry. The same will occur for the other status entry associated with buffer 30C.

Figure 6D:
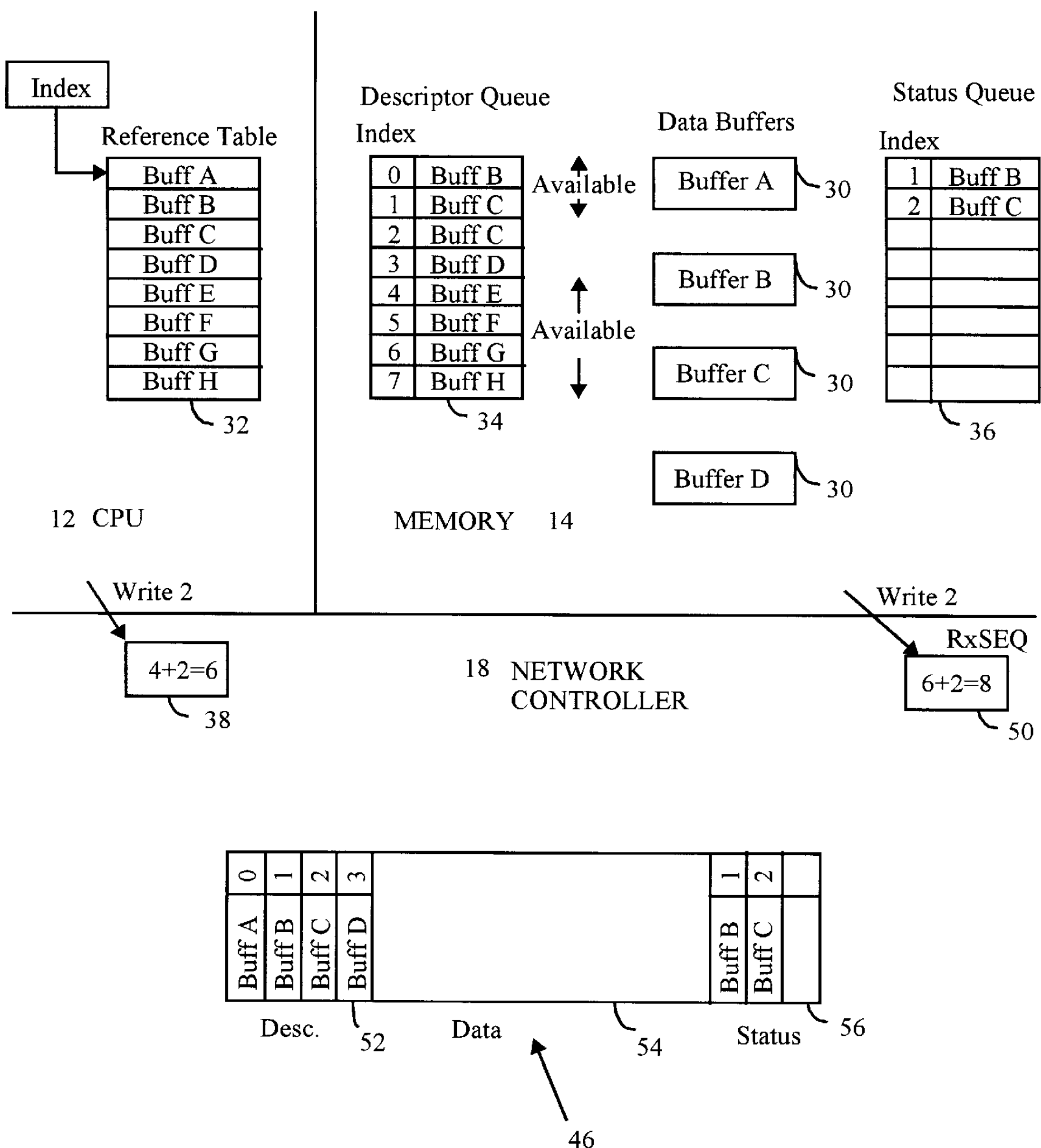

After processing, the CPU 12 returns the buffers 30B, 30C to the receive descriptor queue 34 so that they may be used once again (FIG. 6D). The CPU 12 therefore writes the descriptors and indices for buffers 30B, 30C into the next two locations in the circular receive descriptor queue 34 following the last one of the available buffers (30H in this example). The CPU 12 also writes the value of 2 into both the receive descriptor enqueue register 38 and the receive status enqueue register 50, causing both of their values to be incremented by 2. The value in the receive descriptor enqueue register 38 is 6 (4+2=6), representing the number of available buffers 30 in the receive descriptor queue 34. The value in the receive status enqueue register 50 is 8 (6+2=8), representing the number of available status entries in the receive status queue 36.

At the point in the process depicted in FIG. 6D, the descriptors in the bottom four locations (for buffers 30E–30H) of the receive descriptor queue 34 are available, as are those for the next two locations in the receive descriptor queue 34, located at the top two locations (now for buffers 30B and 30C) in the receive descriptor queue 34. Locations three and four in the receive descriptor queue 34 do not contain descriptors that are available.

After the operational step depicted in FIG. 6D, there are 6 receive descriptors available in the receive descriptor queue in the order of 30E, 30F, 30G, 30H, 30B and 30C. The descriptors for buffers 30A and 30D are in the descriptor FIFO 52, and may be filling up with data frames from the source on channel 3. The value in the receive descriptor enqueue register 38 is 6, indicating that there are 6 descriptors available for moving from the receive descriptor queue 34 into the descriptor FIFO 52. The value in the receive status enqueue register is 8, indicating that there are 8 status entries available in the receive status queue 36.

The order of the receive descriptors in the receive descriptor queue 34 is different at this stage in the operation than immediately after initialization. As more data frames are received over different channels, the order of the descriptors (and therefore the buffers) will bear no relation to their initial order. However, this is not a concern as the available descriptors and buffers are always contiguous in the circular receive descriptor queue 34. There is no need to mark the descriptors as available or not available since the receive descriptor current address register 58 is always updated to point to the next available descriptor, and it is known how many descriptors are available. For example, in FIG. 6D, it is known from the receive descriptor current address register 58 that the next available descriptor is for buffer 30E (the fifth location in the receive descriptor queue 34). It is also known from the receive descriptor enqueue register 38 that there are 6 available receive descriptors. Therefore, the CPU 12 and the network controller 18 are aware that buffer 30E and the descriptors for the next 5 buffers which follow buffer 30E in the receive descriptor queue 34, in whatever order, are available.

An exemplary embodiment of the network controller 18 is depicted in the block diagram of FIG. 7. The network controller 18 includes a media access controller (MAC) 60 and a MAC interface 62, which connect the network controller 18 to the multiple external channels. Control signals for the MAC interface 62 are passed between a descriptor processor 44 and the MAC interface 62. The descriptor processor includes a front end descriptor processor 66, a back end descriptor processor 68 and descriptor processor registers 70. The descriptor processor 44 processes the descriptors from the receive descriptor queue 34, and interfaces with a DMA controller 72 and a random access memory (RAM) 74. The RAM 74 contains the descriptor FIFO 52, the data FIFO 54 and the status FIFO 56. Although only the receive descriptor FIFO 54, the receive data FIFO 54 and the receive status FIFO 56 were depicted in FIGS. 6A–6D, the RAM 74 also contains a transmit descriptor FIFO, transmit data FIFO and a transmit status FIFO in exemplary embodiments. These transmit FIFOs have not been depicted in the Figures so as not to obscure the present invention.

The network controller 18 has a pair of 66/33 converters 76 and 78, which convert data between single and double words for storage in the RAM 74. The 66/33 converter 76 is coupled to a bus interface 80 that couples the network controller 18 to the bus 16. In the exemplary embodiment of FIGS. 1 and 7, the bus 16 is a PCI bus, so the bus interface 80 is a PCI interface.

FIG. 8 is a block diagram of the receive portion of the MAC interface 62 constructed in accordance with an embodiment of the present invention. From the MAC 60, a byte (8 bits) of information is directly provided to an end of frame status FIFO 82, which in the exemplary embodiment, is 16 deep. The end of frame status FIFO 82 also receives as an input a signal from a flow control 84 that also performs address filtering.

From a hold circuit 86, the bytes are provided to a byte-to-word converter 88. The words are then sent to a data FIFO 90 that is four deep, for example. The words are provided from the data FIFO 90 to a hold circuit 92. The output of the end of frame status FIFO 82 is sent to another hold circuit, the status hold circuit 94. The outputs of the status hold circuit 94 and the hold circuit 92 are coupled to an amplifier 96 whose output is coupled to the RAM 74 (FIG. 7) through the 66/33 converter 78.

The specific block diagrams of the network controller 18 according to FIGS. 7 and 8 are exemplary only, as other configurations of the network controller and the receive MAC interface, as well as the location and arrangement of the various registers and FIFO's, are contemplated within the spirit and scope of the present invention.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A method of managing a multi-channel multi-channel direct memory access (DMA) operation, comprising:

providing each of a plurality of data buffers with a different index uniquely identifying the data buffer;

storing descriptors of the data buffers and the indexes of the data buffers in locations of a circular descriptor queue;

indicating to a network controller the number of descriptors in the descriptor queue, corresponding to the data buffers, that are available for use in a DMA transfer;

the network controller obtaining a set of available descriptors from the descriptor queue that is stored in a block of locations that are contiguous to one another in the descriptor queue, the set of descriptors being unavailable in the descriptor queue after being obtained by the network controller;

performing a DMA transfer with a host system via the network controller using at least some of the available data buffers whose descriptors were obtained;

tracking a status entry for each data buffer used in a DMA transfer through a receive status queue; and refilling the descriptor queue with the descriptors and indices of the data buffers used in the DMA transfer, the descriptors being refilled in the locations in the descriptor queue that immediately follow the location of a last one of the available descriptors in the descriptor queue, the refilled descriptors constituting newly available descriptors in the descriptor queue, such that all of the available descriptors in the descriptor queue are always in contiguous locations in the descriptor queue.

2. The method of claim 1, wherein the step of indicating to the network controller the number of descriptors in the descriptor queue that are available for use in a DMA transfer includes decrementing the number when the network controller obtains the set of descriptors, by an amount equal to the number of descriptors in the set of descriptors.

3. The method of claim 2, wherein the step of indicating to the network controller the number of descriptors in the descriptor queue that are available for use in a DMA transfer includes incrementing the number when the descriptor queue is refilled, by an amount equal to the number of descriptors refilled in the descriptor queue.

4. The method of claim 3, wherein the incrementing and decrementing is performed on a number stored in a register.

5. The method of claim 1, wherein the step of writing in a status queue includes writing in the receive status queue the index for each data buffer used in a DMA transfer.

6. The method of claim 5, further comprising the host system reading the indices in the receive status queue to determine the data buffers used in the DMA transfer.

7. The method of claim 6, further comprising the host system using the indices in the receive status queue to index a reference table having specific entries for each data buffer.

8. An arrangement for managing multi-channel direct memory access (DMA) transfers of data, comprising:

a bus;

a host system having a central processing unit (CPU) and a memory coupled to the bus, the memory having a plurality of data buffers;

a multi-channel network controller coupled to the bus, the network controller transferring data received at the network controller to the host system via data buffers that are available for use;

wherein the memory includes a circular descriptor queue having a plurality of locations for storing descriptors of the data buffers, the descriptors of data buffers that are currently available for use in a DMA transfer being stored in locations contiguous to one another in the descriptor queue, wherein the memory further includes a receive status queue to which a status entry is written after each data buffer is used in a DMA transfer, the CPU refilling the descriptor queue with descriptors of the data buffers for which status entries were written in the receive status queue;

a first register that maintains the number of descriptors that are currently available in the descriptor queue; and a second register that maintains the address of the location of the first descriptor of the contiguous currently available descriptors in the descriptors queue.

9. The arrangement of claim 8, wherein the CPU includes means for incrementing the first register storing the number of descriptors that are currently available in the descriptor queue when the CPU refills the descriptor queue, by an amount equal to the number of descriptors refilled.

10. The arrangement of claim 9, wherein the network controller includes means for decrementing the first register storing the number of descriptors that are currently available in the descriptor queue when the network controller obtains the currently available descriptors from the descriptor queue.

11. The arrangement of claim 10, wherein the network controller includes a descriptor FIFO that is maintained in a filled condition by the network controller with currently available descriptors from the descriptor queue as determined by the numbers in the first register and the address in the second register.

12. The arrangement of claim 11, wherein the memory further includes a reference table containing separate entries for storing information regarding each of the specific data buffers, the entries being accessed by the CPU through a different index for each data buffer.

13. The arrangement of claim 12, wherein the locations in the descriptor queue include storage for the indices of the data buffers with the descriptors of the data buffers.

14. The arrangement of claim 13, wherein the status entries in the receive status descriptor queue include storage for the indices of the data buffers with the status entries.

15. A multi-channel network controller for transferring data between a host system and external devices that are connected to the network controller by multiple channels, the host system having memory with data buffers, a descriptor queue and a receive status queue, the network controller comprising:

a first register that maintains a number of descriptors that are currently available in the descriptor queue for use in a direct memory access (DMA) transfer;

a second register that maintains an address of the location of the first descriptor of the currently available descriptors in the descriptor queue;

a descriptor FIFO for temporarily storing currently available descriptors that are obtained from the descriptor queue; and a descriptor processor that controls obtaining the currently available descriptors from the descriptor queue for temporary storage in the descriptor FIFO, the descriptor processor retrieving as many currently available descriptors as possible to fill the descriptor FIFO, based on the number in the first register and the address in the second register.

16. The device of claim 15, further comprising means for decrementing the first register storing the number of descriptors that are currently available in the descriptor queue when the network controller obtains the currently available descriptors from the descriptor queue.

17. The device of claim 16, further comprising a data FIFO that temporarily stores data received on the multiple channels until the data is stored in one of the data buffers.

18. The device of claim 17, further comprising a receive status FIFO that temporarily stores status entries to be written to the receive status queue after the data buffers are filled with data.

* * * * *